United States Patent Office.

PLEASANT A. COBB, OF LYNCHBURG, VIRGINIA.

Letters Patent No. 102,093, dated April 19, 1870.

IMPROVED EXTRACT FOR THE CURE OF CANCER AND OTHER DISEASES.

The Schedule referred to in these Letters Patent and making part of the same.

To all whom it may concern:

Be it known that I, PLEASANT A. COBB, of Lynchburg, in the State of Virginia, have invented a certain new and useful Extract for the Cure of Cancer and other Diseases; and I do hereby declare that the following is a full, clear, and exact description of the manner of making and using the same, and of the several ingredients thereof.

In preparing this extract I take about equal quantities of the following roots and barks, broken into pieces of moderate size or somewhat pounded in a mortar.

White-oak bark, (quercus alba.)
Red-oak bark, (quercus rubra.)
Black-hawes root, (viburnum prunifolium.)
He, or stag's-horn, sumach root, (rhus typhina.)
Sassafras root, (laurus sassafras.)
Persimmon bark, (diospyros Virginianum.)
Dog-wood root, (cornus Florida.)

These roots and barks I subject to the action of water of about the temperature of 212° Fahrenheit. The time to which I thus expose them to the water will be due to the freshness or dryness of the barks and roots, and will be continued until the medicinal strength is abstracted, which can readily be ascertained by occasionally taking out a piece of the roots or barks and tasting of it.

When the strength of the roots and barks is obtained, I pour off the fluid and evaporate it down to the consistence of ordinary paste. This constitutes the extract; and this extract I apply to the cancers and other diseases.

The application sets up at first a sloughing action, releasing the cancer from the flesh and allowing of its easy removal, and then creating a healing and healthy process in the flesh or diseased surfaces.

Now, what I claim as my invention, and desire to secure by Letters Patent, is—

The extract for the cure of cancers, &c., made in the manner and of the ingredients as herein recited.

This specification signed this 1st day of February, 1870.

PLEASANT A. COBB.

Witnesses:
 THOS. T. EVERETT,
 ROBERT EVERETT.